(12) United States Patent
Qiu et al.

(10) Patent No.: US 9,515,849 B2
(45) Date of Patent: Dec. 6, 2016

(54) METHOD AND APPARATUS FOR MANAGING COMMUNICATION FAULTS

(75) Inventors: Chaoxin Qiu, Austin, TX (US); Arshad Khan, Austin, TX (US); Niral Sheth, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1030 days.

(21) Appl. No.: 12/644,203

(22) Filed: Dec. 22, 2009

(65) Prior Publication Data

US 2011/0149951 A1    Jun. 23, 2011

(51) Int. Cl.
*H04L 12/66* (2006.01)
*H04L 12/46* (2006.01)
*H04L 12/24* (2006.01)

(52) U.S. Cl.
CPC ............. *H04L 12/66* (2013.01); *H04L 12/241* (2013.01); *H04L 12/2488* (2013.01); *H04L 12/4675* (2013.01)

(58) Field of Classification Search
CPC . H04L 12/66; H04L 12/241; H04L 12/2488; H04L 12/4675
USPC .................................. 370/352, 356
See application file for complete search history.

(56) References Cited

U.S. PATENT DOCUMENTS

| 7,613,170 | B1 * | 11/2009 | Grabelsky et al. | ........... 370/352 |
| 8,233,492 | B1 * | 7/2012 | Shankar et al. | ............. 370/401 |
| 2003/0154420 | A1 * | 8/2003 | Wray et al. | .................. 714/2 |
| 2004/0121726 | A1 * | 6/2004 | Bifano et al. | .................. 455/8 |
| 2005/0180317 | A1 * | 8/2005 | Shimada | ........................ 370/217 |
| 2007/0014259 | A1 * | 1/2007 | Fajardo et al. | ............... 370/331 |
| 2007/0195752 | A1 * | 8/2007 | Gayde et al. | ................. 370/352 |
| 2007/0237175 | A1 * | 10/2007 | Benedyk et al. | .............. 370/467 |
| 2008/0013447 | A1 * | 1/2008 | Lauber | .......................... 370/225 |
| 2008/0317011 | A1 * | 12/2008 | Datta et al. | .................... 370/356 |
| 2009/0067439 | A1 * | 3/2009 | Yamamoto et al. | ......... 370/400 |
| 2010/0074100 | A1 * | 3/2010 | Suzuki et al. | ................ 370/221 |
| 2010/0124163 | A1 * | 5/2010 | Qiu et al. | ....................... 370/216 |

OTHER PUBLICATIONS

Kaplan et al., "A Session Identifier for the Session Initiation Protocol (SIP)", Mar. 2009, pp. 1-11; http://tools.ietf.org/html/draft-kaplan-sip-session-id-02 (web site last visited Dec. 22, 2009.

* cited by examiner

*Primary Examiner* — Khaled Kassim
(74) *Attorney, Agent, or Firm* — Hanley, Flight & Zimmerman, LLC

(57) ABSTRACT

A system that incorporates teachings of the present disclosure may utilize, for example, a method involving receiving from a first communication device a service request while providing back-up services to an out-of-service network element, detecting a deficiency in call state information to process the service request, transmitting to the first communication device an error message that prevents termination of an active Internet Protocol (IP) communication path between the first communication device and a second communication device, and receiving from the first communication device a request for an alternate IP communication path for communicating between the first and second communication devices which resolves the deficiency in call state information. Additional embodiments are disclosed.

20 Claims, 5 Drawing Sheets

400

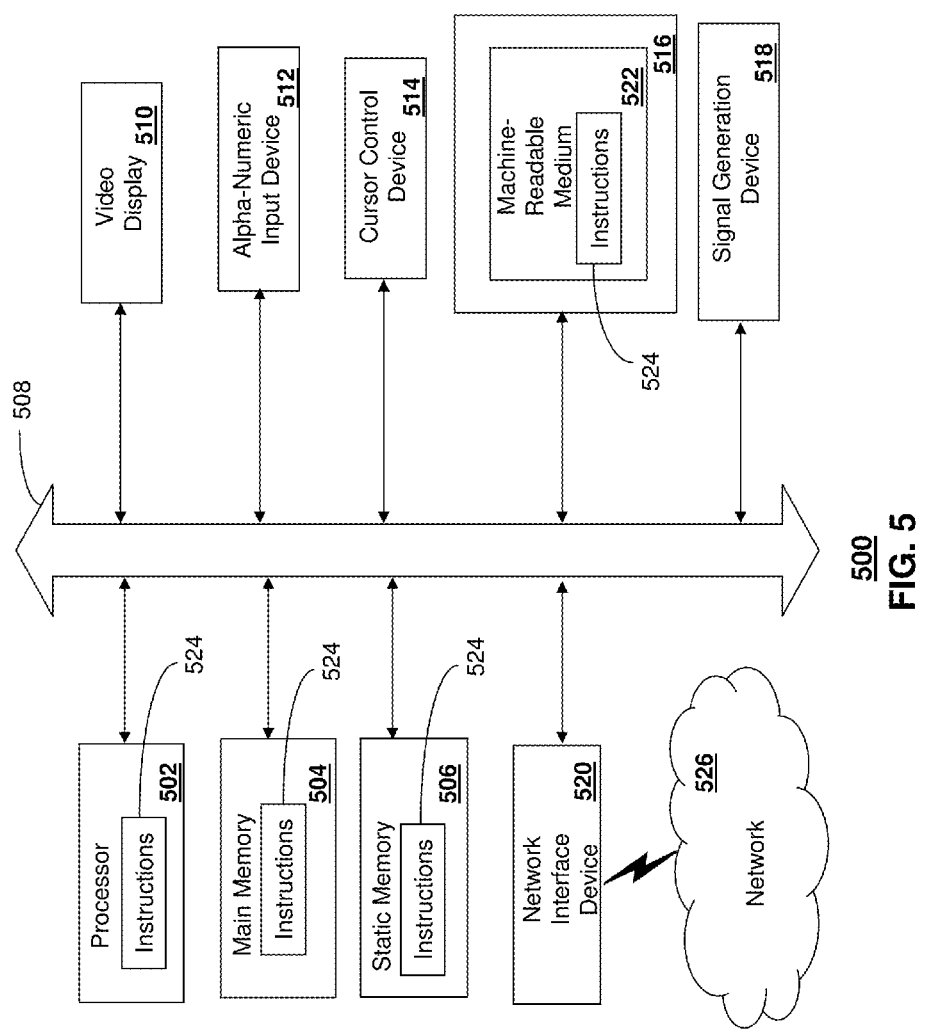

METHOD AND APPARATUS FOR MANAGING COMMUNICATION FAULTS

RELATED APPLICATION

U.S. patent application Ser. No. 12/271,251, filed Nov. 14, 2008, by Qiu et al., entitled "Methods To Preserve Stable Calls For NGNs During Failover." All sections of the aforementioned application are incorporated herein by reference.

FIELD OF THE DISCLOSURE

The present disclosure relates generally to communication fault management, and more specifically to a method and apparatus for managing communication faults.

BACKGROUND

Telecommunication networks commonly rely on replicating call state information between active and standby call processors in order to preserve continuity in call processing after the active call processor fails over to its standby unit. In traditional telecommunication networks, this approach is common in high cost public switched telephone networks (PSTN) switches that use hardware level technologies to assist replication of call states in real time

BRIEF DESCRIPTION OF THE DRAWINGS

FIG. 5 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
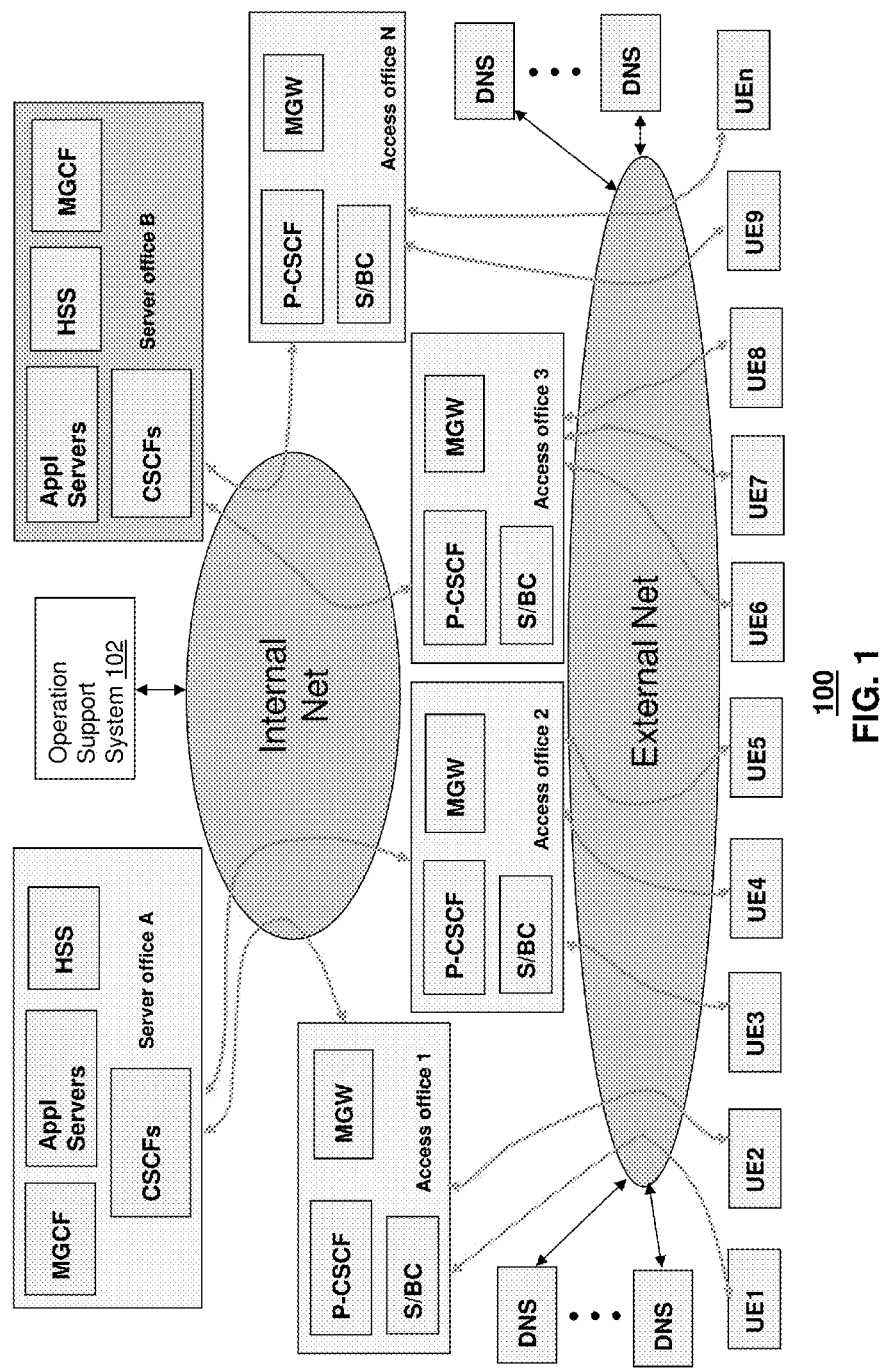
FIGS. 1-2 depict illustrative embodiments of a communication system.

One embodiment of the present disclosure entails a communication device, having a controller to transmit a first session initiation protocol (SIP) message that traverses a call signaling path of a communication network to establish a first communication session that generates a first Voice over Internet Protocol (VoIP) bearer communication path for communicating with another communication device, wherein a plurality of network elements in the call signaling path each store at least one of a plurality of call states relating to the first communication session, wherein the second SIP message includes a service request, receive a third SIP message from a failover network element that replaced one of the plurality of network elements in the call signaling path, wherein the third SIP message indicates that the failover network element is unable to process the service request due to a lack of call state information, transmit a fourth SIP message over the call signaling path requesting to establish a second communication session to generate a second VoIP bearer communication path with the other communication device while maintaining the first communication session with the other communication device active over the first VoIP bearer communication path, and transmit a fifth SIP message to terminate the first communication session and the first VoIP bearer communication path. The communication devices can transition an original voice communication session taking place in the first VoIP bearer communication path to the second VoIP bearer communication path prior to the termination of said first communication session.

One embodiment of the present disclosure entails a standby network element having a controller to provide back-up services to a network element experiencing a service outage, receive from a first communication device a first SIP message corresponding to a service request, wherein the first communication device is engaged in a first communication session with a second communication device over a first communication path, detect a state of deficiency in call state information to process the service request, transmit to the first communication device a second SIP message indicating that the standby network element is unable to process the service request responsive to said detection, and receive from the first communication device a third SIP message to establish an alternate communication session between the first and second communication devices to resolve the state of deficiency in call state information.

One embodiment of the present disclosure entails a method involving receiving from a first communication device a service request while providing back-up services to an out-of-service network element, detecting a deficiency in call state information to process the service request, transmitting to the first communication device an error message that prevents termination of an active IP communication path between the first communication device and a second communication device, and receiving from the first communication device another service request for an alternate IP communication session for communicating between the first and second communication devices which resolves the deficiency in call state information.

Figure 2:
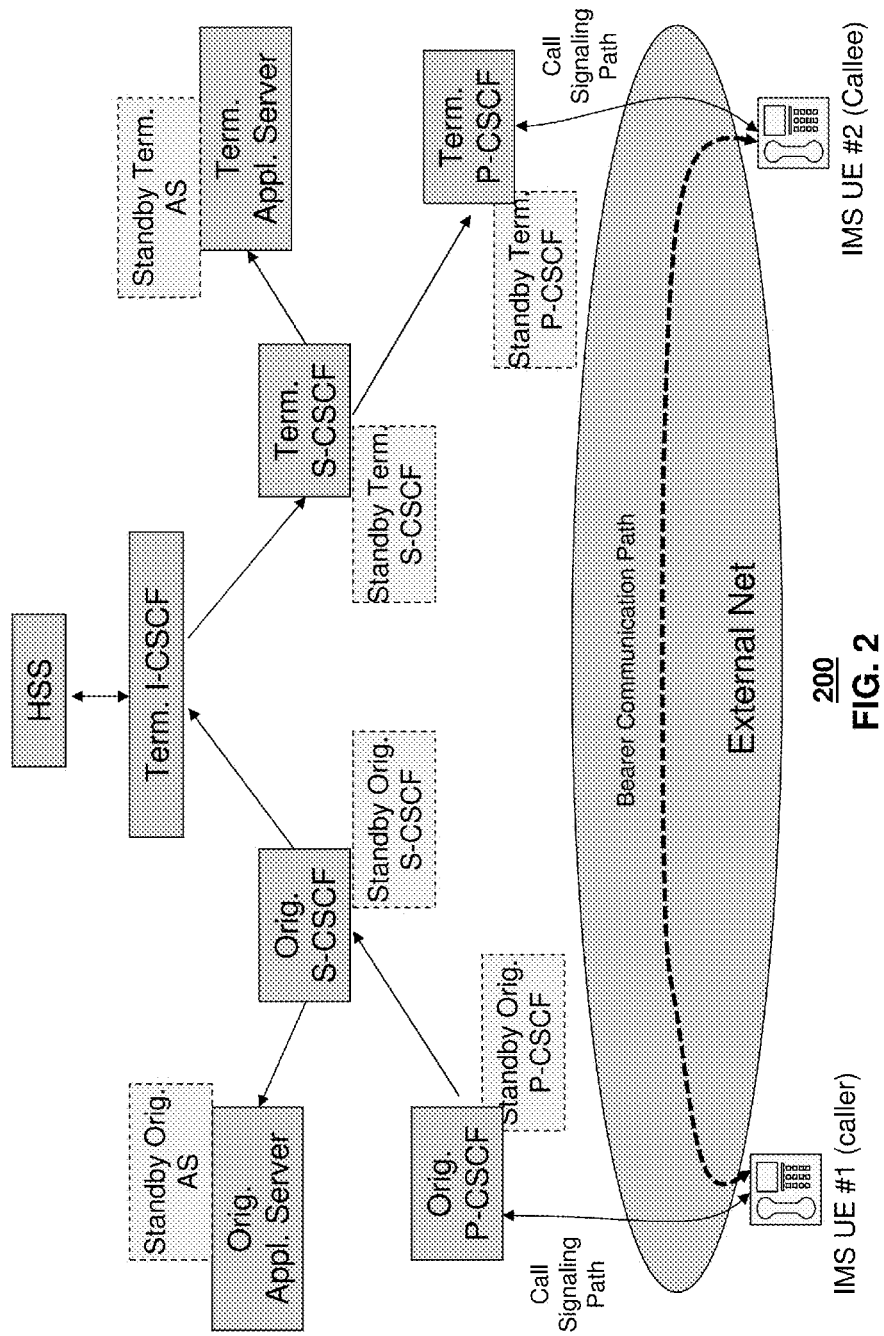

FIGS. 1-2 depict illustrative embodiments of a communication system. FIG. 1 depicts a Next Generation Network (NGN) comprising network elements that among other things can provide subscriber services such as Voice over Internet Protocol (VoIP), and a hybrid communications between VoIP and PSTN communication devices. NGN networks can have Access Offices which can communicate with subscriber devices in the form of user endpoint (UE) communication devices (herein referred to as UEs) over a Public External Network of a service provider. The Public Network can be combination of third party ISPs that provide Internet access to UEs in the last mile. The Access Offices can include among other things a Session Border Controller (S/BC) for interfacing with the UEs to provide communication services thereto by way of a Proxy Call Session Control Function (P-CSCF) which communicates with a Server Office over an Internal Network of the service provider such as a Multi-Protocol Label Switching (MPLS) network. The Media Gateway (MGW) can be used to support hybrid communications between the UEs by providing interworking between IP-based voice packet flows and PSTN TDM-based voice circuits.

In the case of VoIP communications, a VoIP bearer path can be created between UEs. Generally, two UEs (UE1 and UE2) can become aware of an IP address and port of the other on which voice packets are to be sent and received. An IP transport connectivity can be established between the two UEs such that voice packets can be transmitted to their respective remote IP address and port. It should be noted that the qualifiers "first", "second", "third", "fourth" and "fifth"

SIP messages are used as a matter of convenience for illustration purposes and do not represent a specific order of SIP messages nor do they refer to a specific type of SIP messages. It is further noted that some or many intermediate SIP messages can exist between the aforementioned SIP messages. It is also noted that the call signaling path and the bearer communication paths mentioned in the present disclosure can be IP-based. Consequently, such paths are virtual rather than fixed paths for the transport of signaling and voice packets, respectfully. These paths are virtual in that the network elements (e.g., routers) for which signaling or voice packets traverse can vary in contrast to traditional circuit-switched implementations.

The S/BC can submit communication requests initiated by the UEs to the Server Office via a P-CSCF. The Server Office in turn can manage such requests utilizing combinations of CSCFs, Application Servers, a Media Gateway Control Function (MGCF) which supports PSTN communications, and a Home Subscriber Server (HSS). The network elements of the Server Offices and access offices singly or in combination provide resources to establish communications between UEs of a VoIP or PSTN type. The service provider of the communication network of FIG. 1 can provision the UEs by way of Domain Name Systems (DNS) servers which can be programmed by the service provider as desired.

FIG. 2 depicts an illustrative embodiment of the NGN network of FIG. 1. As the FIG. 2 illustrates, a call signaling path can have a number of standby network elements such as the P-CSCF, S-CSCF, and application servers. In this configuration if a primary network element in the call signaling path experiences a failure, scheduled maintenance, or a network topology reconfiguration, the standby network element can take control of operations during the service outage of a particular faulty network element. During normal operations, an originating UE can submit a SIP INVITE message by way of the calling signaling path to establish a communication session with a SIP dialog and an opening of a VoIP bearer communication path with the terminating UE. Once the bearer path has been established, voice communications can take place between the originating and terminating UEs 1 and 2 as shown in FIG. 2.

If a standby network element is called into service while a bearer path has been established between UEs, any attempt by either of the UEs to initiate additional communication services (e.g., a request to add a third party UE to the call of FIG. 2) by way of the call signaling path can result in a termination of the bearer communication path when the request reaches the standby network element. The termination results from a SIP error message submitted by the standby network element due to a lack of call state information describing the existing communication session in conversation, which was previously known to the primary network element that was placed out of service.

Figure 3:
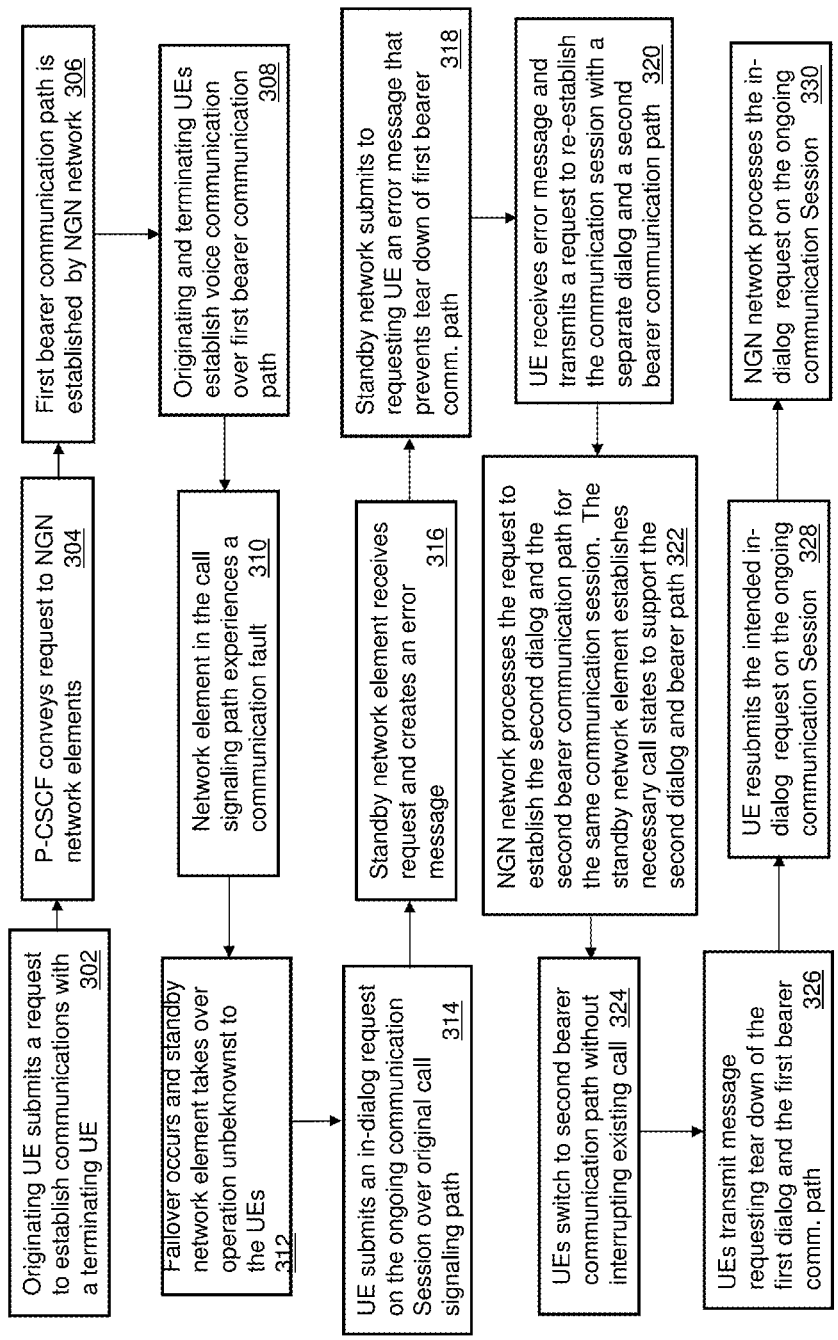
FIG. 3 depicts an illustrative embodiment of a method operating in portions of the communication system of FIGS. 1-2.
Figure 4:
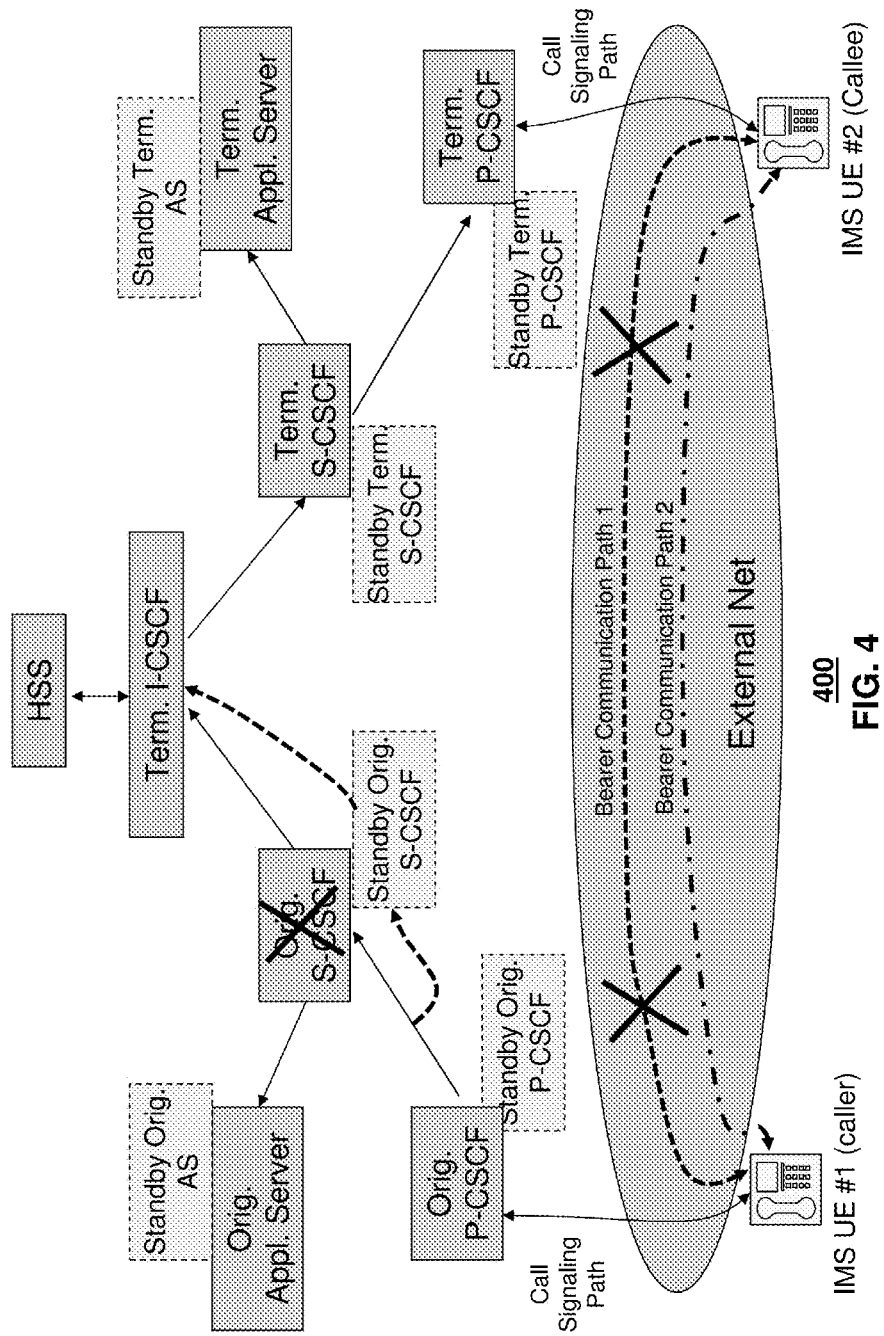
FIG. 4 depicts an illustrative embodiment of an operation of the communication of FIGS. 1-2 according to the method of FIG. 3.

FIG. 3 depicts a method 300 operating in portions of the NGN network of FIGS. 1-2 to resolve aforementioned problem. FIG. 4 depicts how method 300 can operate in the NGN network. Method 300 can begin with step 302 where an originating UE submits a request to establish communications with a terminating UE. The request can be a SIP INVITE message with a conversation identifier (ID). The conversation ID as will be described shortly can be stored by the network elements of the NGN network operating in the call signaling path as call state information to later identify the communication session established between the UEs. The conversation ID can comprise any unique form of identification such as, for example, a calling party's phone number, a called party's phone number, a time stamp, a session ID, or a random number, or a combination of the above. A P-CSCF from which the originating UE operates can receive the SIP INVITE message in step 304 and convey it to other network elements of the NGN network (e.g., orig. S-CSCF, orig. application server, HSS, term. I-CSCF, term. S-CSCF, term. P-CSCF, etc.) to establish a communication session with a first bearer communication path between the originating and terminating UEs.

Once the first bearer communication path has been created, the network elements store the conversation ID supplied by the originating UE with other common call state information such as the dialog ID associated with the communication session of the call signaling path. Once the first bearer communication path has been established in step 306, in step 308 the originating and terminating UEs engage in a voice communication session over the first bearer communication path.

For illustration purposes suppose that one of the network elements in the call signaling path experiences a communication fault in step 310. Further suppose that the fault occurs at the originating S-CSCF of FIG. 4. Under these circumstances, the standby S-CSCF takes over operations of the primary originating S-CSCF in step 312. The failover operation takes place unbeknownst to the originating and terminating UEs which remain engaged in the voice communication session over the first bearer communication path.

Suppose also that a user of the originating UE decides to add another party to the communication session by, for example, depressing a "Flash" button on the UE, and dialing a number of a third party UE. This action results in the originating UE transmitting in step 314 over the original call signaling path an in-dialog SIP INFO message with the original dialog ID to initiate the call with the third party UE. When the standby S-CSCF receives the SIP INFO message in step 316 it discovers it does not have call state information for the communication session identified dialog ID and creates an error message indicating that the session associated with the dialog ID is unknown to the standby S-CSCF. The error message is transmitted to the originating UE in step 318. The error message can be, for example, a 450 Call/Session Unknown message, which prevents termination of the communication session when received by other network elements of the NGN system.

When the originating UE receives the error message in step 320, it transmits a new SIP INVITE message including the same conversation ID and a new dialog ID to cause the network elements of the NGN network to re-establish the communication session with a second SIP dialog with a second bearer communication path with the terminating UE in step 322, while maintaining the first bearer communication path active. The SIP message with the conversation ID and dialog ID causes the network elements in the call signaling path (including the standby S-CSCF) to generate new call state information for the second communication dialog. The new call state information resolves the deficiency in call state information previously experienced by the standby S-CSCF. When the terminating UE receives the SIP message with the same conversation ID and a new dialog ID, it recognizes in step 324 from the use of the same conversation ID that the UEs need to switch the voice communication session from the first bearer communication path to the second bearer communication path of the new dialog session without interrupting the existing call.

Once the originating and terminating UEs transition to the second bearer communication path, the UEs transmit a SIP BYE message to the NGN network in step 326 to tear down the first SIP dialog session and the first bearer communication path as shown in FIG. 4. The new dialog session represents a new call signaling path that supports services of the second bearer communication path. With the standby S-CSCF having call state information, the originating UE can now reinitiate in step 328 the SIP INFO message with the original conversation ID and the new dialog ID to request a communication session with the third party UE which reaches the standby-CSCF without issues and is conveyed to other network elements of the NGN network to successfully add in step 330 the third UE to the second bearer communication path utilizing similar signal processing techniques as was used to establish communication between UEs 1 and 2.

From the foregoing descriptions, it would be evident to an artisan with ordinary skill in the art that the aforementioned embodiments can be modified, reduced, or enhanced without departing from the scope and spirit of the claims described below. For example, method 300 can be applied to other network elements (e.g., terminating S-CSCF) that fail in the call signaling path. Method 300 can also be adapted to prevent a standby network element from generating panic error messages that can tear down an active bearer path when a SIP session timer at either UE in FIG. 4 (or other network elements in the call signaling path) expires and thereby invokes the generation of a SIP UPDATE message.

Other suitable modifications can be applied to the present disclosure without departing from the scope of the claims below. Accordingly, the reader is directed to the claims section for a fuller understanding of the breadth and scope of the present disclosure.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first communication device, comprising:
   memory including machine readable instructions; and
   a processor to execute the instructions to perform operations including:
      transmitting a first session initiation protocol message that traverses a call signaling path of a communication network to establish a first communication session for communicating with a second communication device, a plurality of network devices in the call signaling path each storing call state information related to the first communication session, the call state information including a first conversation identifier and a first dialog identifier;
      after a failover network device has replaced one of the plurality of network devices in the call signaling path, transmitting a request message including the first dialog identifier; and
      in response to receiving an error message from the failover network device indicating that the failover network device has a deficiency associated with the first dialog identifier of the request message, transmitting a second session initiation protocol message over the call signaling path to establish a second communication session with the second communication device while maintaining the first communication session with the second communication device, the second session initiation protocol message including a second dialog identifier to resolve the deficiency of the failover network device.

2. The first communication device of claim 1, the first communication device corresponding to one of a cellular telephone and a landline telephone.

3. The first communication device of claim 1, the plurality of network devices including at least one of a proxy call session control function, a serving call session control function, and an interrogating call session control function.

4. The first communication device of claim 1, the first session initiation protocol message including a session initiation protocol INVITE message.

5. The first communication device of claim 1, the request message including a session initiation protocol INFO message.

6. The first communication device of claim 1, the second session initiation protocol message including a session initiation protocol INVITE message.

7. The first communication device of claim 6, the session initiation protocol INVITE message including the first conversation identifier that identifies the first communication session.

8. The first communication device of claim 7, the first conversation identifier including at least one of a first identifier associated with the first communication device, a second identifier associated with the second communication device, a time stamp, a session identifier, and a random number.

9. The first communication device of claim 7, at least a portion of the plurality of network devices in the call signaling path and the failover network device to establish the second communication session responsive to receiving the first conversation identifier and the second dialog identifier.

10. The first communication device of claim 1, the operations further including sending a third session initiation protocol message to terminate the first communication session, the third session initiation protocol message including a session initiation protocol BYE message.

11. The first communication device of claim 1, the first communication session to generate a first Voice over Internet Protocol bearer communication path and the second communication session to generate a second Voice over Internet Protocol bearer communication path, the first and second Voice over Internet Protocol bearer communication paths to operate according to a real-time transport protocol.

12. The first communication device of claim 7, the communication network including at least one of a voice over Internet Protocol communication network, an Internet Protocol multimedia subsystem communication network, and a next generation network, and the first and second communication devices to transition an original voice communication session taking place in a first Voice over Internet Protocol bearer communication path to a second Voice over Internet Protocol bearer communication path without changing the first conversation identifier.

13. A standby network device to provide back-up services to a primary network device experiencing a service outage, the standby network device comprising:
   a storage device including machine readable instructions; and
   a processor to execute the instructions to perform operations including:
      detecting a deficiency of the standby network device associated with a first dialog identifier in response to receiving a service request related to a first session initiation protocol message including a first conversation identifier and the first dialog identifier, the service request received from a first communication device, the first communication device being engaged in a first communication session with a second communication device over a first communication path;
      in response to detecting the deficiency, transmitting an error message to the first communication device to invoke the first communication device to provide a second dialog identifier; and
      establishing an alternate communication session between the first and second communication devices using the first conversation identifier and the second dialog identifier while maintaining the first communication session.

14. The standby network device of claim 13, at least one of a primary network device and the standby network device including at least one of a proxy call session control function, a serving call session control function, and an interrogating call session control function, the service outage resulting from at least one of a fault experienced by the primary network device, a maintenance procedure applied to the primary network device, and reconfiguration of network topology affecting the primary network device.

15. The standby network device of claim 13, the establishing of the alternate communication session including using a second session initiation protocol message including the first conversation identifier and the second dialog identifier to establish the alternate communication session.

16. The standby network device of claim 13, the first and second communication devices to transmit a second session initiation protocol message to terminate the first communication path when the first and second communication devices transition an original voice communication session taking place in the first communication path to a second communication path associated with the alternate communication session.

17. The standby network device of claim 13, the error message to prevent termination of the first communication path, and the first communication path and a second communication path associated with the alternate communication session to provide at least voice communication services and to correspond to Voice over Internet Protocol communication paths.

18. A method performed by a first network device, comprising:
   detecting, while providing back-up services to an out-of-service network device, a deficiency associated with a first dialog identifier in response to receiving a service request including a first conversation identifier and the first dialog identifier from a first communication device;
   transmitting, via an interface, an error message to the first communication device to invoke the first communication device to provide a second dialog identifier; and
   establishing, via a processor, an alternate communication session to communicate between the first and second communication devices using the first conversation identifier and the second dialog identifier while maintaining an active communication session between the first and second communication devices.

19. The method of claim 18, the first network device is implemented by one of a proxy call session control function, a serving call session control function, and an interrogating call session control function, and the first communication device and the first network device are to utilize session initiation protocol messages to communicate.

20. The first communication device of claim 1, wherein the first communication device is an originating device, the second communication device is a terminating device, and the request message is a request to add a third communication device to the first communication session.

* * * * *